(12) United States Patent
Missalla et al.

(10) Patent No.: US 8,833,275 B2
(45) Date of Patent: Sep. 16, 2014

(54) PROCESS AND PLANT FOR THE THERMAL TREATMENT OF FINE-GRAINED SOLIDS

(75) Inventors: Michael Missalla, Oberursel (DE); Edgar Gasafi, Karlsruhe (DE); Jean Claude Hein, Niddatal (DE); Andreas Orth, Friedrichsdorf (DE); Jean-Paul Nepper, Friedrichsdorf (DE)

(73) Assignee: Outotec Oyj, Espoo (FI)

( * ) Notice: Subject to any disclaimer, the term of this patent is extended or adjusted under 35 U.S.C. 154(b) by 1207 days.

(21) Appl. No.: 12/675,448

(22) PCT Filed: Aug. 28, 2008

(86) PCT No.: PCT/EP2008/007047
§ 371 (c)(1),
(2), (4) Date: Oct. 4, 2010

(87) PCT Pub. No.: WO2009/027084
PCT Pub. Date: Mar. 5, 2009

(65) Prior Publication Data
US 2011/0013662 A1    Jan. 20, 2011

(30) Foreign Application Priority Data
Aug. 31, 2007  (DE) .......................... 10 2007 041 427

(51) Int. Cl.
| | |
|---|---|
| F23G 5/00 | (2006.01) |
| F27B 15/10 | (2006.01) |
| B01J 8/18 | (2006.01) |
| F27B 15/02 | (2006.01) |
| F23C 6/04 | (2006.01) |
| F23C 10/10 | (2006.01) |

(52) U.S. Cl.
CPC .............. *B01J 8/1836* (2013.01); *F27B 15/10* (2013.01); *B01J 8/1827* (2013.01); *B01J 2208/00504* (2013.01); *F23C 2900/10002* (2013.01); *B01J 2208/0053* (2013.01); *B01J 2208/00176* (2013.01); *B01J 2208/00371* (2013.01); *F27B 15/02* (2013.01); *B01J 8/1818* (2013.01); *F23C 6/04* (2013.01); *B01J 8/1863* (2013.01); *F23C 10/10* (2013.01)
USPC ........................... 110/245; 110/243; 110/244

(58) Field of Classification Search
CPC ................................... F23G 5/30; F23G 5/027
USPC ......................................... 110/245, 243, 244
See application file for complete search history.

(56) References Cited

U.S. PATENT DOCUMENTS

| | | | |
|---|---|---|---|
| 2,670,272 A | 2/1954 | Nutting | |
| 3,485,584 A | 12/1969 | Zimgibl et al. | |

(Continued)

FOREIGN PATENT DOCUMENTS

| | | |
|---|---|---|
| DE | 1259851 B | 2/1968 |
| DE | 4023060 A1 | 1/1992 |

(Continued)

OTHER PUBLICATIONS

International Search Report mailed on Oct. 31, 2008, which issued during the prosecution of corresponding International Patent Application No. PCT/EP2008/007047; 3 pages.

*Primary Examiner* — Kenneth Rinehart
*Assistant Examiner* — Gajanan M Prabhu
(74) *Attorney, Agent, or Firm* — Leydig, Voit & Mayer, Ltd.

(57) ABSTRACT

A process for at least one of a chemical and a physical treatment of fluidizable substances in a reactor. The process includes introducing a hot gas into an interior of the reactor through a gas supply tube and cooling at least one of the hot gas and the gas supply tube with a coolant. The cooling is performed by contacting the hot gas with the coolant so as to provide a temperature of a wall of the gas supply tube at least 50° C. lower than a temperature of the gas at an inlet of the gas supply tube facing away from the interior of the reactor.

10 Claims, 3 Drawing Sheets

(56) References Cited

U.S. PATENT DOCUMENTS

| | | | |
|---|---|---|---|
| 3,605,276 A * | 9/1971 | Enders | 34/578 |
| 3,623,711 A * | 11/1971 | Thorstenson | 60/754 |
| 3,752,224 A | 8/1973 | Sproul | |
| 4,284,401 A * | 8/1981 | Tatebayashi et al. | 431/7 |
| 4,288,214 A * | 9/1981 | Harman | 432/58 |
| 4,290,800 A * | 9/1981 | Sensis et al. | 75/10.38 |
| 4,628,833 A * | 12/1986 | O'Hagan et al. | 110/263 |
| 4,815,482 A | 3/1989 | Clift et al. | |

FOREIGN PATENT DOCUMENTS

| | | |
|---|---|---|
| DE | 4422607 A1 | 1/1996 |
| DE | 10260741 A1 | 7/2004 |
| DE | 10260739 B3 | 9/2004 |
| EP | 0630683 A1 | 12/1994 |
| WO | 01/44719 A1 | 6/2001 |
| WO | 2004/056701 A1 | 7/2004 |

* cited by examiner

PROCESS AND PLANT FOR THE THERMAL TREATMENT OF FINE-GRAINED SOLIDS

CROSS REFERENCE TO PRIOR APPLICATIONS

This application is a U.S. National Phase application under 35 U.S.C. §371 of International Application No. PCT/EP2008/007047, filed on Aug. 28, 2008 and which claims benefit to German Patent Application No. 10 2007 041 427.9, filed on Aug. 31, 2007. The International Application was published in English on Mar. 5, 2009 as WO 2009/027084 A1 under PCT Article 21(2).

FIELD

The present invention relates to a process for the chemical and/or physical treatment of fluidizable substances in a reactor, such as in a fluidized-bed reactor, wherein hot gas, such as the waste gas of a combustion chamber upstream of the reactor, in which fuel and combustion air are burnt at temperatures of 1000 to 1500° C., is introduced into the reactor interior via a gas supply tube. The present invention also relates to a plant for the thermal treatment of granular solids.

BACKGROUND

DE 102 60 741 A1 describes a process as mentioned above and a respective plant in which hot gas with a temperature of about 1130° C. is generated in a combustion chamber upstream of the reactor and supplied to the reactor. Inside the reactor, this hot gas then can be cooled to about 750° C., for instance by contact with the cooler substances to be treated and/or by mixing with fluidizing gas. However, the hot gas enters the reactor with a comparatively high temperature and in said reactor gets in contact with the solids to be treated, which on the one hand can lead to local overheating and on the other hand also greatly stresses the components of the reactor.

EP 0 630 683 B1 discloses the introduction of hot gas into a reactor, wherein the hot gas is cooled by solid particles inside the reactor. In addition, cooling panels can be provided in the reactor.

In some applications, for instance when calcining clay, the temperature inside the reactor should not be above 700° C. Therefore, for instance in the processes mentioned above, problems arise in such applications when the fluidizable substances to be treated get in contact with the distinctly hotter waste gas of a combustion chamber. For such applications, such as the calcination of clay, conventional inexpensive fuels such as natural gas, petroleum or coal therefore cannot be directly burnt in the reactor. Thus, only a fuel such as butane, which ignites at lower temperatures, can also be used for a direct combustion inside the reactor space. Such fuels, however, which burn at lower temperatures, are comparatively expensive.

In other applications, hot gases are created and will be used in the downstream process parts as hot as possible in order to introduce the heat into these process parts.

The above-mentioned plants, in which hot gas is introduced into the reactor interior with temperatures of 500 to 1600° C., for example, 1000 to 1500° C., are furthermore expensive to manufacture because the gas supply tube, through which the waste gas of the combustion chamber or from other processes is passed, must be made of a heat-resistant material such as high-temperature resistant steel. Due to the great temperature differences with respect to other components of the plant, high thermal stresses can also occur.

An aspect of the present invention is to provide a process and a plant as mentioned above, which provide for the use of inexpensive fuels or hot waste gases and at the same time allow a gentle treatment of fluidizable substances in the reactor, wherein the loads acting on the reactor or the components remain limited.

SUMMARY

In an embodiment, the present invention provides for a process for at least one of a chemical and a physical treatment of fluidizable substances in a reactor. The process includes introducing a hot gas into an interior of the reactor through a gas supply tube and cooling at least one of the hot gas and the gas supply tube with a coolant. The cooling is performed by contacting the hot gas with the coolant so as to provide a temperature of a wall of the gas supply tube at least 50° C. lower than a temperature of the gas at an inlet of the gas supply tube facing away from the interior of the reactor.

BRIEF DESCRIPTION OF THE DRAWINGS

The present invention is described in greater detail below on the basis of embodiments and of the drawings in which.

DETAILED DESCRIPTION

Figure 1:
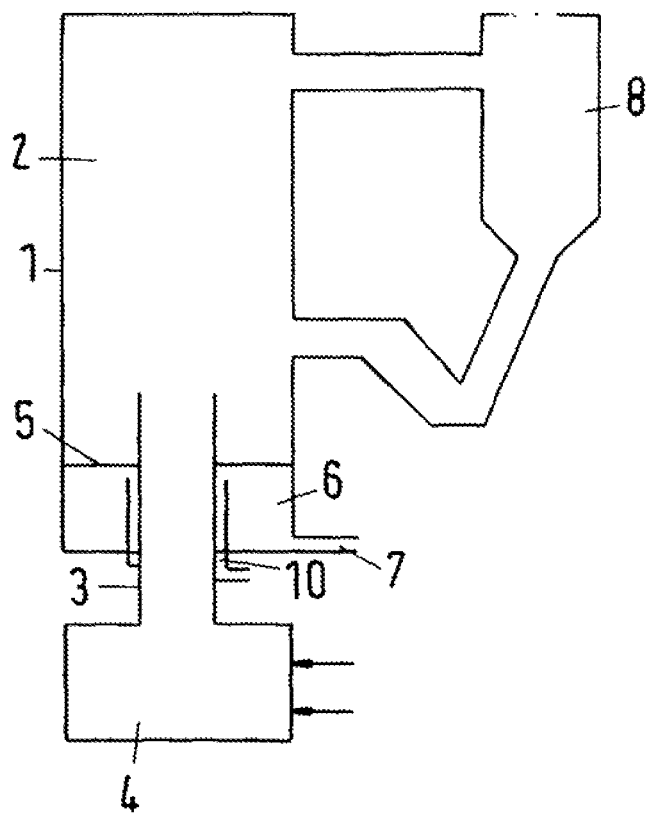
FIG. 1 schematically shows a plant in accordance with an embodiment of the present invention.

In an embodiment of the present invention, the gas and/or the gas supply tube is cooled with a coolant such that the fluidizable substances in the reactor are sufficiently heated, but the components of the reactor are not exposed to excessive thermal and mechanical loads. By charging the gas supply tube with a coolant, it is therefore possible to use a less expensive material for the gas supply tube despite the very high temperatures of the gas in the gas supply tube, as the same is subjected to lower temperature resistance requirements. This advantageous effect can further be increased in that as a result of cooling, the wall of the gas supply tube has a distinctly lower temperature, in particular lower by at least about 100° C., preferably by about 150° C., than the gas at the inlet of the gas supply tube. By means of cooling, the gas in the gas supply tube itself is hardly cooled, however, and the gas at the reactor-side outlet of the gas supply tube mostly is only cooler by less than 200° C., preferably less than 100° C. than at the inlet.

In accordance with a first embodiment of the present invention, the coolant cannot get in direct contact with the gas in the gas supply tube during cooling. This provides for the use of coolants optimized in terms of their cooling properties, without having to consider interactions with the hot gas, such as the waste gas of the combustion chamber, and/or the substances to be treated in the reactor.

Water can, for example, therefore be used as coolant. To simplify the construction of the cooling means, the temperature of the water is, for example, up to about 100° C., so that no appreciable pressure can be built up. In principle, however, pressure-resistant cooling means are also possible in which water from a steam system or from upstream regions is used for cooling the gas supply tube and/or the waste gas. Due partly to the small heat-exchange surfaces, the heat gain for a steam system can also only be small when cooling the hot gas and/or the gas supply tube. The cooling effect is sufficient, however, to protect the gas supply tube from being damaged and from excessive thermal loads.

Heat transfer oils or other coolants are of course also possible, an can, for example, be advantageously used in other parts of the plant, for example, for heating up other substances or as a secondary circuit for heat recovery.

The coolant can be passed through an annular and/or helical cooling duct formed on the inside and/or outside of the gas supply tube. Thus, not only the gas in the gas supply tube, but the wall of the gas supply tube can be cooled to such an extent that no expensive, high-temperature resistant material must be used for the gas supply tube.

In an embodiment of the present invention, the material of the gas supply tube can be a radiation-reflecting material or have a reflecting coating, such as tinplate, so that heating up by radiation is reduced.

In an embodiment of the present invention, the coolant can be directly contacted with the hot gas during cooling. The objective is to keep the flow of the hot gases away from the wall of the gas supply tube by selective and metered supply of the coolant.

The resulting thorough mixing of the hot gas, for example, the waste gas of the combustion chamber, with the coolant, should be minimized and can effect a more efficient cooling of the gas at the edges of the gas supply tube. The gas thus generally enters the reactor with a slightly lower temperature, but the temperatures at the edge of the gas supply tube are much lower than the average temperature of the gas at the inlet of the gas supply tube.

In an embodiment of the present invention, the coolant can be introduced into the gas supply tube and/or a portion of the reactor adjoining the gas supply tube and be mixed there with the hot gas. The coolant can thus be introduced into the gas supply tube or the reactor, for instance from a perforated tube, a membrane and/or via an orifice plate. This allows a uniform cooling of the gas supply tube without the occurrence of temperature gradients generating thermal stresses. The supply of the coolant can be effected such that there is only a minimum intermixture with the gas in the gas supply tube, and a boundary layer of cold coolant is substantially built up on the inside of the gas supply tube.

The gas supply tube can be shielded particularly efficiently from the gas passed through with high temperature when the coolant is introduced into the gas supply tube such that a coolant layer enveloping the gas is at least partly formed. The coolant can flow along the inner wall of the gas supply tube or along a cooling means provided in the same and thus form a cooler gas cushion between the hot gas and the gas supply tube.

In an embodiment of the present invention, the coolant is introduced into the gas supply tube, for example, by an orifice plate in which the orifices are distributed around the supply tube. These orifices can be formed in a way so that the coolant enters the gas supply tube in a tangential direction. In this case a very good and small film of coolant is formed around the wall of the supply tube.

As coolant which can also get in contact with the gas, ambient air can be used. However, any other gas can be used for this purpose, for example, cooled and cleaned waste gas from other processes or process stages. Gases which have a much higher viscosity or which must be supplied additionally for the reaction in the fluidized-bed reactor can be used. In accordance with an embodiment of the present invention, the coolant, for instance cooling gas, can have a rather low temperature, for example, between about 0 and 400° C., or below 200° C.

In an embodiment of the present invention, the coolant can be delivered in liquid or even solid form to the inner wall of the gas supply tube, where it can then be evaporated or sublimed and thereby form a gas cushion or a liquid layer which protects the inner wall of the gas supply tube against the heat. Water is particularly useful here as coolant. In a further embodiment, this liquid or solid coolant can be introduced within a gas stream, for example, as droplets or fine particles.

In accordance with the present invention, the hot gas introduced into the reactor through the gas supply tube can come from another process, for example, from a heat exchanger. In this case, the gases in the gas supply tube have a temperature of about 600 to 1000° C. In the reactor, an internal combustion can take place, but due to the thermal loads caused by the gas supplied, the gas supply tube should be cooled. Depending on the temperature of the gas in the gas supply tube, far less heat-resistant and hence less expensive materials can also be used, such as steel which only is heat-resistant up to 600° C., or up to 500° C., or even only up to 450° C. (for example, boiler plate, H2 steel).

As an alternative to heating the substances to be treated by a combustion directly inside the reactor or by supplying hot gas from another process, the waste gas of a combustion chamber upstream of the reactor, in which fuel and combustion air is burnt at temperatures of about 1000 to about 1500° C., can also be supplied to the reactor as hot gas. This leads to high temperatures in the gas supply tube, which require efficient cooling and/or the use of heat-resistant materials, but the decoupling of the combustion in the combustion chamber and the treatment of substances in the reactor also allows inexpensive fuels to be used. Due to the interposed cooling, natural gas, petroleum or coal as well as biomass or waste materials can thus also be used as fuel, which require a distinctly higher ignition temperature or combustion temperature than is necessary or desirable for the treatment inside the reactor at a temperature of, for example, 500 to 700° C.

In the process of the present invention, an ash-producing fuel can also be used as fuel, wherein a gas cleaning possibly is provided between the combustion chamber and the fluidized-bed reactor. The combustion can, for instance, be effected in a horizontal cyclone in which ash of the fuel is separated from the hot waste gas and precipitated. This allows the use of inexpensive and locally available fuels. The choice of the fuel also is dependent on the requirements of the substance to be treated. Substances which have no increased requirements concerning the freedom from impurities can be calcined by ash-containing fuels, whereas substances which must remain free from impurities, such as white paper filler, must be treated with ash-free fuels.

Another alternative for heating the substances is the use of a waste gas, such as from an electric furnace. In this case the hot gases have a temperature of 1000° C. to 1900° C.

In accordance with an embodiment of the present invention, the reactor can be a fluidized-bed reactor in which a stationary fluidized bed is annularly formed around the gas supply tube. In this case, a gas can be passed as coolant through a cooling tube provided around the gas supply tube and can subsequently be guided into a gas distributor provided below the stationary fluidized bed, so that the cooling gas can be introduced into the stationary fluidized bed as fluidizing gas via a tuyère bottom. To maintain the temperature inside the reactor within the temperature limits optimal for the treatment of substances, for instance in the case of clay calcination below about 700° C., the supplied quantity of the hot gas in the gas supply tube can, for example, be controlled and/or regulated on the basis of the temperature in the reactor.

An embodiment of the present invention provides a plant for the thermal treatment of granular solids, which includes a fluidized-bed reactor, in which the solids are introduced via a solids supply conduit and in which they are thermally treated substantially at a temperature of about 300° C. to about 1200° C., for example from about 500° C. to about 700° C., and a gas supply tube, which for supplying process gas opens substantially centrally into the fluidized bed reactor from below. A combustion chamber can be provided upstream of the fluidized-bed reactor in which fuel is burnt at a temperature of, for example, 1000 to 1500° C. and which is connected with the fluidized-bed reactor via the gas supply tube. In accordance with the present invention, an annular cooling duct for cooling the gas supply tube and the process gas can at least partly be associated to the gas supply tube, which is connected with a coolant source for supplying coolant with a temperature of below about 400° C., for example, below about 100° C. The flow cross-section of the cooling duct preferably is smaller than the flow cross-section of the gas supply tube, so that the coolant is strongly heated by the gas supply tube or the process gas. Due to the configuration of the plant of the present invention with a cooling duct, simple steels can be used for the gas supply tube which are heat-resistant up to about 800° C., for example, up to about 700° C., or up to about 650° C. (an example is 16Mo3 steel). The use of expensive, highly heat-resistant chrome-nickel steels can therefore be avoided. At the same time, the temperature inside the reactor can be kept low, without having to renounce the use of inexpensive fuels, which require a higher ignition temperature and/or combustion temperature.

In an embodiment of the present invention, the plant comprises an electric furnace, and the waste gases of the electric furnace are supplied to a reactor, for example, a fluidized-bed reactor, in which solids are treated with at least a part of this waste gas.

In an embodiment of the present invention, the gas supply tube of the fluidized-bed reactor can be annularly surrounded by a stationary fluidized bed, and the plant can include a gas distributor provided below the stationary fluidized bed, from which fluidizing gas can be introduced into the stationary fluidized bed via a tuyère bottom. Above the gas supply tube and the stationary fluidized bed, a turbulence mixing chamber can be provided for the intensive mixing of the solids. The cooling duct of the present invention can at least partly constitute an annular space between the gas distributor and the gas supply tube, wherein the cooling duct can be connected with the gas distributor formed below the stationary fluidized bed of the fluidized-bed reactor. The gaseous coolant flowing through the cooling duct thus can also be used for fluidizing the stationary fluidized bed, and the heat dissipated from the gas supply tube is introduced into the reactor. By means of the configuration in accordance with the present invention, according to which the cooling duct constitutes an annular space between the gas distributor and the gas supply tube, an increased flow velocity can be achieved inside the cooling duct so that a more efficient cooling of the gas supply tube or the gases flowing through the same can be achieved.

In an embodiment of the present invention, the cooling duct includes a plurality of outlet openings distributed around the periphery, which open into the gas distributor. Alternatively, it is also possible that the cooling duct includes an outlet opening annularly formed around its periphery, which opens into the gas distributor. The at least one outlet opening can open into the gas distributor directly below the tuyère bottom.

In an embodiment of the present invention, the plant of the present invention includes a cooling tube in the gas supply tube such that between the gas supply tube and the cooling tube an annular cooling duct can be formed. The gas supply tube can therefore be cooled on its inside by the coolant flowing in the annular cooling duct.

In embodiment of the present invention, outlet openings can be provided in the cooling tube for connecting the cooling duct with the reactor interior or the interior of the gas supply tube. In this way, a coolant layer enveloping the waste gas of the combustion chamber and flowing along the inner wall of the gas supply tube or of the cooling tube can be formed, which as a gas cushion prevents an excessive heating of the gas supply tube or of the cooling tube.

When the fluidized-bed reactor constitutes a Venturi reactor, the cooling tube can open into a flared portion with outlet openings for connecting the cooling duct with the reactor interior. The portion of the cooling tube adjoining the gas supply tube can, for example, extend substantially parallel to the likewise flared bottom of the reactor. In this way, not only the gas supply tube, but also the bottom of the reactor can be cooled.

An efficient cooling can be achieved by using water as coolant. For example, on the inside or outside of the gas supply tube, a cooling duct can at least partly be provided, which can be connected with a coolant source containing water as coolant with a temperature of up to about 100° C. The cooling duct can, for instance, be formed helically and extend around the gas supply tube in the manner of a cooling coil.

To additionally protect the material of the gas supply tube against an excessive thermal load due to the waste gases of the combustion chamber, a studding made of gunned concrete or some other suitable thermal insulating coating can be provided on the inside of the gas supply tube. Even at temperatures of the waste gas of the combustion chamber of 1300° C. and more, the loads of the gas supply tube thus can be minimized.

A gas cleaning means can, for example, be associated to the combustion chamber in the plant of the present invention. The combustion chamber can constitute a horizontal cyclone.

An embodiment of the present invention relates to the use of a material with low heat resistance for instance in the gas supply tube of a plant or of a method as mentioned above.

The plant for the thermal treatment of granular solids, such as for clay calcination, which is shown in FIG. 1, includes a fluidized-bed reactor 1 in whose reactor interior 2 the solids are subjected to a chemical and/or physical treatment.

A gas supply tube (central tube) 3, which is connected with a combustion chamber 4, opens into the reactor interior 2. As indicated by the arrows in FIG. 1, fuel and gas are supplied to the combustion chamber. The waste gas heated to a temperature of up to 1500° C. during the combustion is passed from the combustion chamber 4 via the gas supply tube 3 into the reactor interior 2.

In the reactor 1, a tuyère bottom 5 is provided, which is associated to a gas distributor 6. Through a conduit 7, fluidizing gas is introduced into the gas distributor 6, which reaches the reactor 1 via the tuyère bottom 5. Above the tuyère bottom 5, the gas supply tube 3 is surrounded by an annular stationary fluidized bed, which is intermixed by the fluidizing gas. Furthermore, a recirculation cyclone 8 is schematically indicated in FIG. 1, in which solids discharged from the reactor 1 are separated from the waste gas of the reactor 1 and can possibly be recirculated into the reactor 1.

Figure 2:
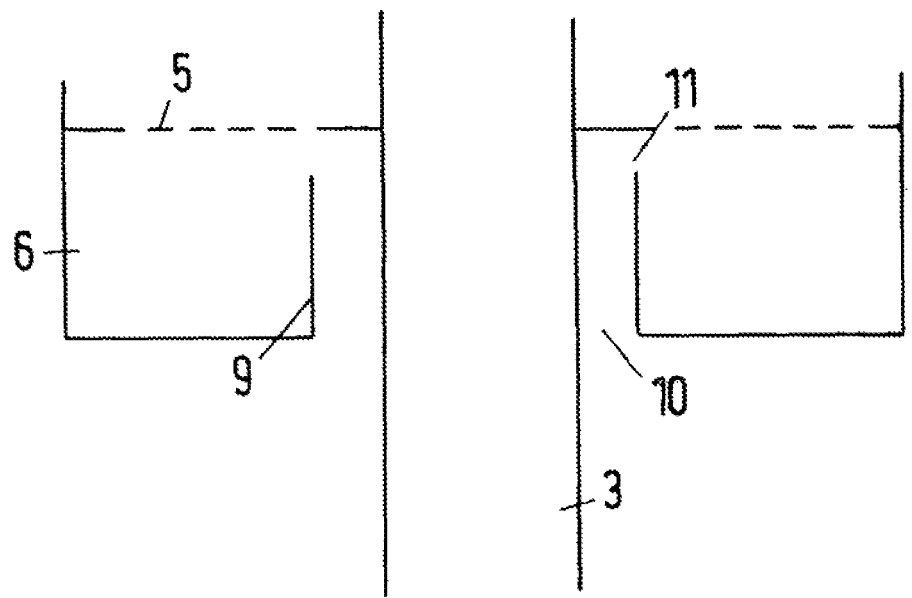
FIG. 2 shows an enlarged representation of a detail of the plant as shown in FIG. 1.

The formation of the gas distributor 6 and of the gas supply tube 3 of the plant as shown in FIG. 1 is illustrated in detail in FIG. 2. The gas supply tube 3 is partly surrounded by a cooling tube 9, so that an annular cooling duct 10 is formed between the outside of the gas supply tube 3 and the inside of the cooling tube 9. A coolant, for instance ambient air, is passed through the cooling duct 10, thereby cooling the wall of the gas supply tube 3 and hence also the waste gas of the combustion chamber 4, which is flowing through the same. As shown in FIG. 2, the cooling tube includes a plurality of outlet openings 11 distributed around the periphery in the vicinity of the tuyère bottom 5, which open into the gas distributor 6. The ambient air used as coolant can thus be introduced into the reactor interior 2 as an additional fluidizing gas. In contrast to the embodiment shown in FIG. 2, in which the coolant is introduced cocurrently with respect to the gas supply tube, it is also possible to countercurrently guide the coolant. The guidance of coolant can be configured such that the part of the gas supply tube protruding into the reactor is cooled first and then the coolant is deflected downwards, so as to countercurrently flow downwards.

Figure 3:
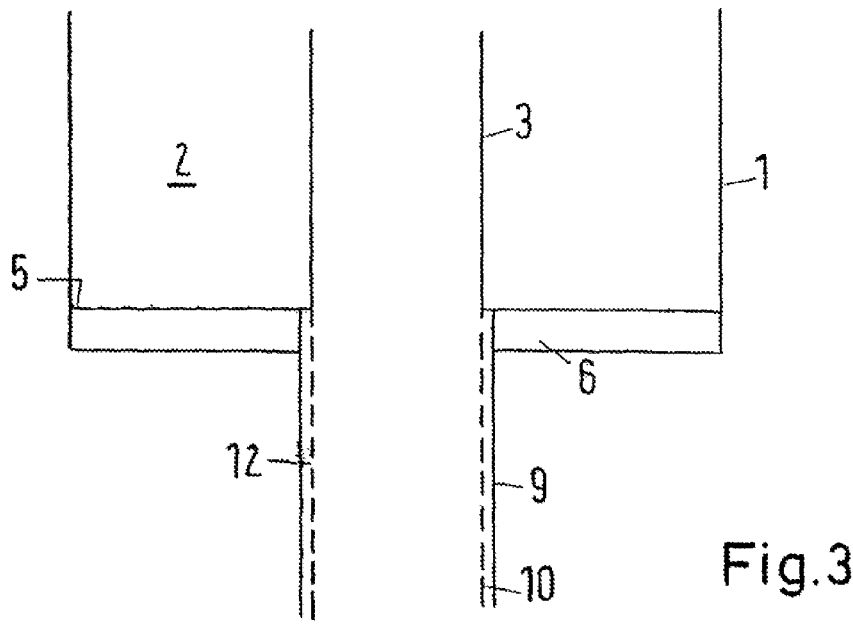
FIG. 3 shows a detail of a plant in accordance with an embodiment of the present invention.

Another embodiment of the present invention is shown in FIG. 3, wherein the components identical with the embodiment described above are provided with the same reference numerals.

In this embodiment, the cooling tube 9 in turn is arranged annularly, surrounding the central gas supply tube 3, so that an annular cooling duct 10 is formed between the gas supply tube 3 and the cooling tube 9. The gas supply tube 3 partly is provided with outlet openings 12, so that a coolant flowing through the annular cooling duct 10 can get into the interior of the central gas supply tube 3. In doing so, the coolant can form a coolant layer flowing along the inner surface of the gas supply tube 3 and thus protect the material of the gas supply tube 3 against an inadmissibly high heating.

Figures 4, 4A:
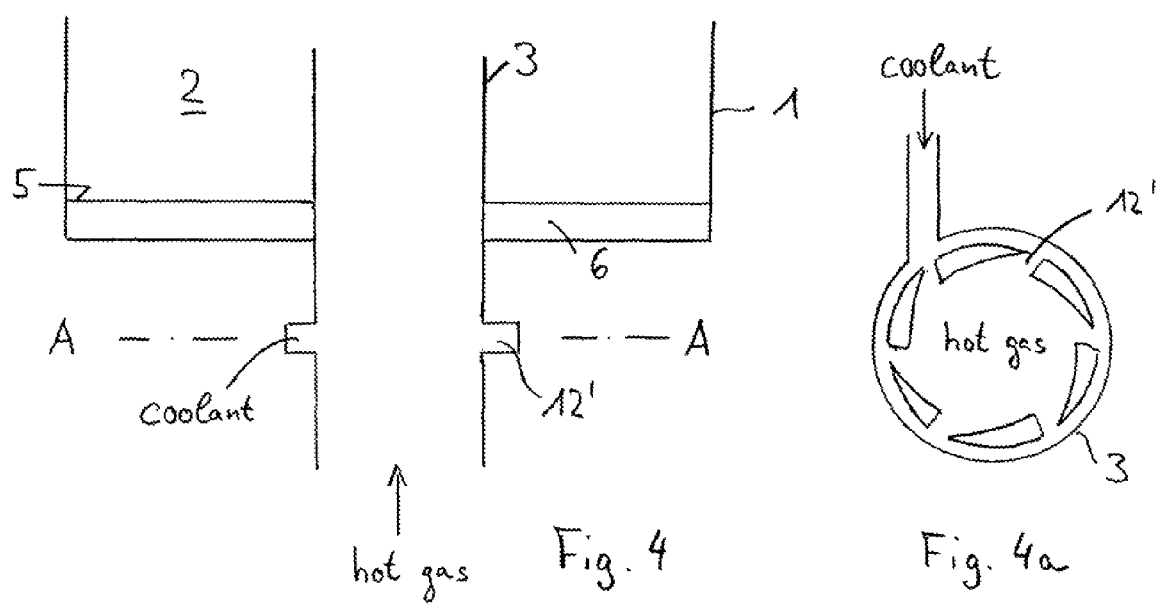
FIG. 4 show a detail of a plant in accordance with an embodiment of the present invention.
FIG. 4a is a sectional view along line A-A in FIG. 4.

FIGS. 4 and 4a show an alternative to the embodiment according to FIG. 3 wherein only some outlet openings 12' are provided at one or two levels around the gas supply tube 3. These openings 12 are preferably provided in a way that the coolant enters the gas supply tube 3 in a tangential direction.

Figure 5:
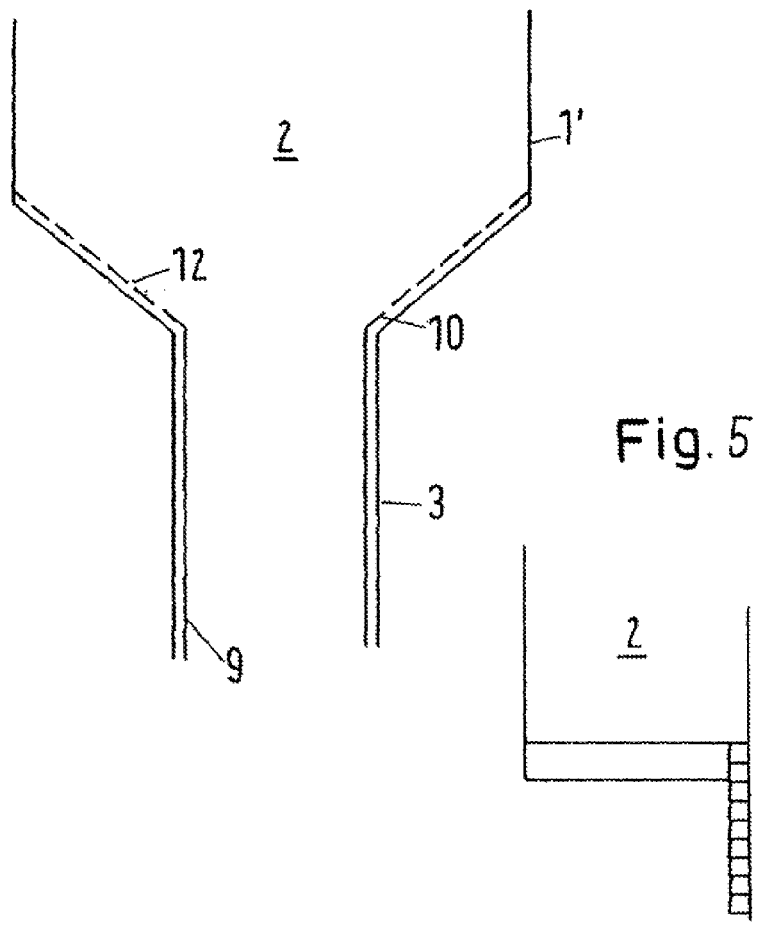
FIG. 5 shows a detail of a plant in accordance with an embodiment of the present invention.

In the embodiment of FIG. 5, the reactor 1' constitutes a Venturi reactor. The cooling tube 9, which is provided inside the central gas supply tube 3, protrudes into the sloped lower region of the reactor 1' and substantially is funnel-shaped like this region. In the funnel-shaped portion of the cooling tube 9, a plurality of outlet openings 12 are formed, so that a coolant, for instance ambient air, can get into the interior 2 of the reactor 1'. Alternatively, however, it is also possible that the coolant is not introduced into the Venturi or annular-fluidized-bed reactor, but is employed in other parts of the process, for example, as preheated air for the combustion chamber.

Figure 6:
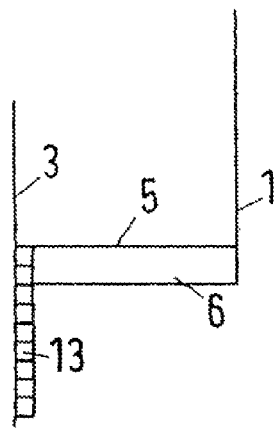
FIG. 6 shows a detail of a plant in accordance with an embodiment of the present invention.

The embodiment shown in FIG. 6 has a similar construction as the embodiment of FIG. 3. However, on the outside of the central gas supply tube 3 a helical cooling duct 13 is formed, through which water is passed as coolant. In contrast to the embodiments described above, the cooling duct 13 is configured such that the water guided in the same cannot get into the central gas supply tube 3 or the interior 2 of the reactor.

Figure 7:
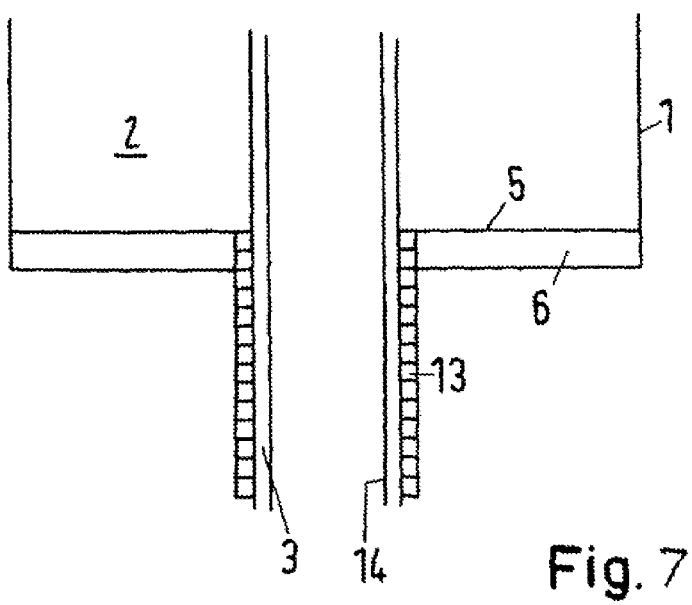
FIG. 7 shows a detail of a plant in accordance with an embodiment of the present invention.

In the embodiment shown in FIG. 7, which substantially corresponds to the embodiment of FIG. 6, a so-called studding 14, for example, a coating with a gunned concrete or some other suitable thermal insulating coating, is additionally provided on the inside of the central gas supply tube 3. In this way, the central gas supply tube can be shielded from the inside by the studding 14 and cooled from the outside by the cooling duct 13.

By means of the cooling of the central gas supply tube 3 as described above, it can be achieved that the waste gas from the combustion chamber 4 is cooled considerably from a temperature of about 1000 to 1500° C., so that the waste gas heats the solids treated in the reactor 1 to a temperature of about 500 to about 700° C.

Example 1

In a reactor as shown in FIG. 1, a gas with a temperature of 1000° C. enters the gas supply tube. By supplying a cooling gas, here nitrogen as inert gas, with a temperature of 100° C., the wall of the gas supply tube is cooled to about 600° C. At the same time, the temperature of the gas in the gas supply tube is cooled to about 950° C.

Example 2

In a reactor as shown in FIG. 5, gas with a temperature of 850° C. is introduced into the gas supply tube. By supplying a cooling gas, here air, with a temperature of 30° C., the wall of the gas supply tube is cooled to about 650° C. As a result, a brick lining of the wall or the use of high-temperature resistant stainless steels can be omitted.

Example 3

In a reactor as shown in FIG. 4 and FIG. 4a, a hot gas from an electric furnace with a temperature of about 1400° C. is introduced into the gas supply tube. Cooling gas having a temperature of about 100° C. is introduced into the gas supply tube 3 tangentially via openings 12, so that a small film of cooling gas is formed around the wall of the gas supply tube 3. The temperature of the wall of the gas supply tube 3 never exceeds 650° C., whereas the gas enters the fluidized-bed reactor with a temperature above 1000° C.: In this way, for example, iron ore can be preheated and/or prereduced in the fluidized-bed reactor at a temperature of about 900-1100° C.

The present invention is not limited to embodiments described herein; reference should be had to the appended claims.

LIST OF REFERENCE NUMERALS

1 fluidized-bed reactor
1' Venturi reactor
2 reactor interior
3 gas supply tube (central tube)
4 combustion chamber
5 tuyère bottom
6 gas distributor
7 conduit
8 recirculation cyclone
9 cooling tube
10 cooling duct
11 outlet opening
12, 12' outlet opening
13 cooling duct
14 studding

The invention claimed is:

1. A process for at least one of a chemical and a physical treatment of fluidizable substances in a reactor, the process comprising:
   introducing a hot gas into an interior of the reactor through a gas supply tube; and
   cooling the hot gas and the gas supply tube with a gas coolant, wherein the cooling is performed by providing the coolant to a cooling tube concentrically surrounding the gas supply tube so as to cool the gas supply tube in a region of the cooling tube and by directly contacting the hot gas in the gas supply tube with the coolant so as to provide a temperature of a wall of the gas supply tube at least 50° C. lower than a temperature of the gas at an inlet of the gas supply tube facing away from the interior of the reactor, wherein the reactor is a stationary fluidized bed reactor with a tuyère bottom, the stationary fluidized bed being formed annularly around the gas supply tube in the reactor, a gas distributor being disposed below the stationary fluidized bed, the coolant being passed through the cooling tube into the gas distributor and into the stationary fluidized bed as fluidizing gas via the tuyère bottom.

2. The process as recited in claim 1, wherein the coolant is introduced from at least one of a perforated tube and an orifice plate into at least one of the gas supply tube and a portion of the reactor adjoining the gas supply tube so as to mix the coolant therein with the hot gas.

3. The process as recited in claim 1, wherein the coolant is introduced into the gas supply tube so as to at least partly form a coolant layer enveloping the hot gas, wherein the coolant layer flows along an inner wall of the gas supply tube.

4. The process as recited in claim 1, wherein the coolant enters the gas supply tube tangentially.

5. The process as recited in claim 1, wherein the coolant is ambient air.

6. The process as recited in claim 1, further comprising a combustion chamber disposed upstream of the reactor, wherein a fuel and combustion air are supplied into the combustion chamber and burned at a temperature of 1,000° C. to 1,500° C., and wherein a waste gas of the combustion chamber is supplied to the reactor as the hot gas through the gas supply tube.

7. The process as recited in claim 6, wherein a quantity of at least one of the hot gas and the waste gas of the combustion chamber is controlled based on the temperature in the reactor.

8. The process as recited in claim 6, further comprising cleaning the hot gas between the combustion chamber and the fluidized-bed reactor and wherein ash-producing fuels are used as the fuel.

9. The process as recited in claim 1, wherein the hot gas has a temperature of about 1,000° C. to 1,900° C. and is produced in art electric furnace.

10. The process as recited in claim 1, wherein the fluidizable substances are treated in the reactor at a temperature of about 900° C. to 1,100° C.

* * * * *